No. 802,851. PATENTED OCT. 24, 1905.
C. H. FOSTER.
GRINDSTONE FIXTURE.
APPLICATION FILED FEB. 6, 1905.

WITNESSES:
Fred Hauke
W. H. Alexander

INVENTOR
Chas. H. Foster.
BY
Fowler & Bryson
ATTORNEYS

UNITED STATES PATENT OFFICE.

CHARLES H. FOSTER, OF ST. LOUIS, MISSOURI.

GRINDSTONE-FIXTURE.

No. 802,851.　　　Specification of Letters Patent.　　　Patented Oct. 24, 1905.

Application filed February 6, 1905. Serial No. 244,293.

*To all whom it may concern:*

Be it known that I, CHARLES H. FOSTER, a citizen of the United States, residing at the city of St. Louis, State of Missouri, have invented a certain new and useful Improvement in Grindstone-Fixtures, of which the following is such a full, clear, and exact description as will enable any one skilled in the art to which it appertains to make and use the same, reference being had to the accompanying drawings, forming part of this specification.

My invention relates to improvements in grindstone-fixtures, and more particularly to the means for securing the axle in the stone.

It has heretofore been the common practice to secure the axle in the ordinary grindstones of commerce by passing the threaded axle through an opening in a block of wood placed in the square opening in the center of the stone. The passage in the wooden block has been of substantially the same size as the threaded axle, so that the wooden block bears directly upon the threaded axle. End plates have been used to bear against the stones, one of the said end plates abutting against a collar on the axle and the other against a nut upon the axle. These end plates, however, have not entered the wooden block except that short prongs have been placed upon the said end plates to bite into the block and prevent rotation between the end plates and the stone. These prongs, however, have not been of any substantial service in supporting the weight of the stone. Consequently the entire weight of the stone is supported directly upon the threaded axle. In addition to the axle being threaded it is usually cast, thus leaving a flat place on each side, so that the axle forms a very poor bearing with the wooden block, and the result is that the stone soon works loose and gets out of true.

The object of my invention is to provide end plates with annular projections which enter an opening in the wooden block in the center of the stone, whereby the weight of the stone is supported upon the said projections and not directly upon the shaft or axle, thus overcoming the objections referred to.

Figure 1:
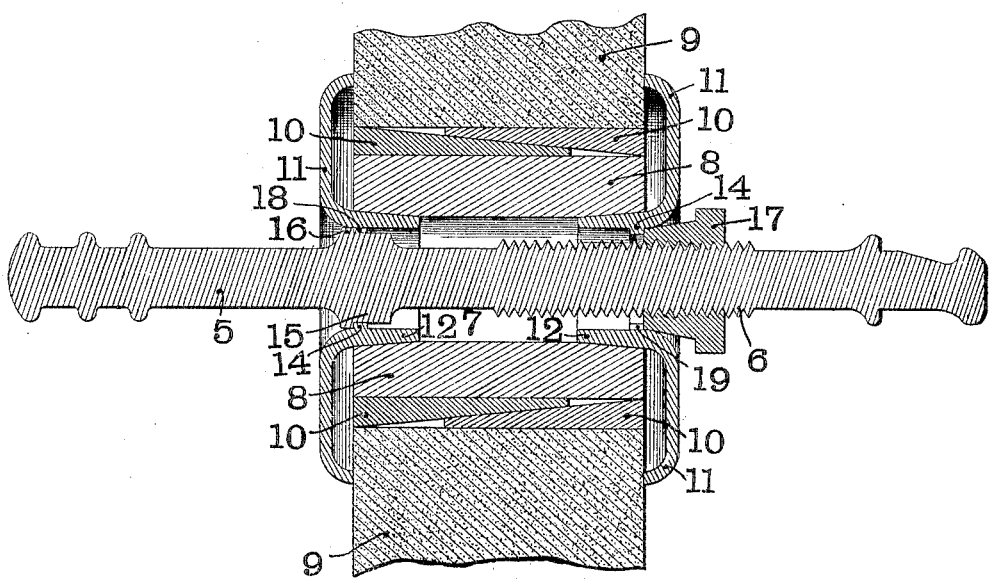
Figure 2:
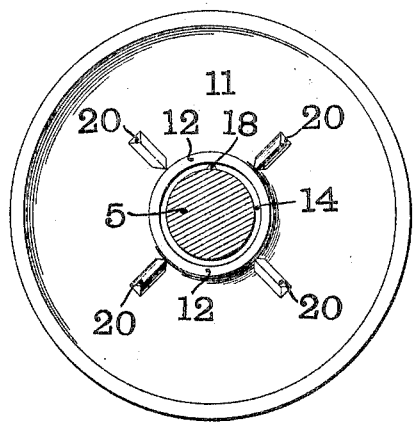

In the accompanying drawings, which illustrate one form of grindstone-fixtures made in accordance with my invention, Figure 1 is a longitudinal section showing a portion of the stone; and Fig. 2 is an elevation of one of the end plates, the axle also being shown in section.

Like marks of reference refer to similar parts in both views of the drawings.

5 is the axle, which is provided with a threaded portion 6. The axle 5 passes through a cylindrical opening or passage 7 in the wooden block 8, which is secured in the square opening in the center of the stone 9. The block 8 is secured in the stone 9 by means of wedges 10 in the usual manner. In place, however, of forming the opening 7 in the block 8 before it is secured to the stone I prefer to first wedge the block in the stone and then after determining the center to bore the passage 7 through the block.

11 represents the end plates, one of which is placed at each side of the stone 9. Each of the end plates 11 is provided with a hollow annular projection 12, through which the axle 5 passes. The projections 12 are slightly tapered from the plate 11 outwardly, as shown in the drawings. In practice, however, this taper is very slight, and it is somewhat exaggerated in the drawings in order to make it apparent. The object of thus tapering the projections 12 is to secure a wedging action when the plates are drawn toward each other against the sides of the stone, so as to form a very tight fit between the projections 12 and the block 8. On the inner faces of each of the projections 12 is a flange 14. Formed on the axle 5 is a collar 15, which fits snugly within one of these flanges 14, and at the outer end of the collar 15 is a flange 16, which abuts against the flange 14. A bearing between the axle 5 and the left-hand end plate 11 is preferably secured both between the flange 14 and collar 15 and between the flange 16 and the inner face of the projection 12, as shown in Fig. 1. At the opposite side of the stone a nut 17 is provided, which engages with the thread 6 on the shaft and bears against the flange 14 of the adjacent end plate 11, the bearing between the shaft and the end plate in this instance being indirectly secured between the nut 17 and the inner face of the projection 12. The collar 15 is also provided with a tooth or prong 18, which engages with a notch 19 in the flange 14, in order to prevent rotation between the shaft and the end plate 11. In order to obviate making two forms of end plate, I form this notch 19 in the flanges 14 of both end plates, although it is unnecessary in the end plate which engages with the nut 17. In place of the usual prongs for engaging with the wooden block 8 I provide the end plates 11 with wedge shape blades 20, preferably adjacent to the projections 12. These blades enter the block 8 and prevent rotation between the end plates and the block, and consequently between the end plates and the stone 9.

It will be evident that in my construction the weight of the stone does not bear directly upon the threaded shaft, but is carried by the projections 12, which in turn have effective bearing-surfaces on the collar 15 and the nut 17, so that there is practically no chance for the stone to work loose and get out of true. In addition to the bearings for preventing the stone from moving out of center the flanges 14, together with the flange 16 and the nut 17, form the end bearing for the stone. As will be readily seen, the position of the flanges 14 is such that countersunk end bearings are formed in the end plates, one of which coöperates with the flange 16, forming a fixed abutment, and the other of which coöperates with the nut 17, forming an adjustable abutment. This feature of having the end bearings countersunk not only economizes space by allowing the bearings to approach more closely to each other than in the ordinary construction, but it also provides practical means for securing the end plates in position for shipment in ready-mounted stones.

Having fully described my invention, what I claim as new, and desire to secure by Letters Patent of the United States, is—

1. In a grindstone-fixture, the combination with an axle, of a pair of end plates each provided with a hollow tapered projection through which said axle passes, said projections supporting the weight of the stone, and means for holding said end plates in position.

2. In a grindstone-fixture, the combination with an axle, of a pair of end plates provided with countersunk end bearings for said shaft, a fixed abutment on said shaft coöperating with one of said countersunk end bearings, and an adjustable abutment on said shaft coöperating with the other of said countersunk end bearings to hold the end plates in position.

In testimony whereof I have hereunto set my hand and affixed my seal in the presence of the two subscribing witnesses.

CHARLES H. FOSTER. [L. S.]

Witnesses:
W. A. ALEXANDER,
BENNETTE PIKE.